United States Patent [19]

Matlack

[11] Patent Number: 4,883,849
[45] Date of Patent: Nov. 28, 1989

[54] NITROGEN COMPOUNDS THAT DELAY THE METATHESIS POLYMERIZATION OF CYCLOOLEFINS

[75] Inventor: Albert S. Matlack, Hockessin, Del.

[73] Assignee: Hercules Incorporated, Wilmington, Del.

[21] Appl. No.: 291,940

[22] Filed: Dec. 30, 1988

[51] Int. Cl.4 .......................... C08F 4/44; C08F 32/00; C08F 36/00

[52] U.S. Cl. .................................... 526/141; 526/189; 526/281; 526/282; 526/283; 502/123; 502/124; 264/328.2

[58] Field of Search ............... 526/141, 189, 281, 282, 526/283; 502/123, 124; 264/328.2

[56] References Cited

U.S. PATENT DOCUMENTS 4,080,491 3/1978 Kobayashi et al. .................. 526/137
4,727,125 2/1988 Nelson ............................ 526/281 X Primary Examiner—Joseph L. Schofer
Assistant Examiner—F. M. Teskin
Attorney, Agent, or Firm—Mark Goldberg

[57] ABSTRACT

Disclosed is a method of delaying the metathesis polymerization of strained ring cycloolefins by addition of certain nitrogen-containing compounds including various aromatic amines or mixtures thereof.

12 Claims, No Drawings

NITROGEN COMPOUNDS THAT DELAY THE METATHESIS POLYMERIZATION OF CYCLOOLEFINS

This invention relates to the polymerization of cycloolefins under the influence of aluminum alkyl and tin alkyl-activated metathesis catalyst systems. In particular, it relates to a metathesis catalyst system whose activation rate is significantly slower and more subject to control than those of presently used activator systems.

Preparation of thermoset cycloolefin polymers via metathesis catalysts is a relatively recent development in the polymer art. Klosiewicz in U.S. Pat. Nos. 4,400,340 and 4,520,181 teaches preparation of such polymers from dicyclopentadiene and other similar cycloolefins via a two-stream reaction injection molding technique wherein a first stream, including a catalyst, and a second stream, including a catalyst activator, are combined in a mix head and immediately injected into a mold where, within a matter of seconds, polymerization and molding to a permanently fixed shape take place simultaneously.

In the presence of a metathesis catalyst system, polymerization takes place extremely rapidly even at low temperatures. In fact, polymerization occurs so rapidly that it is not unusual for the monomer to polymerize to a solid, immobile condition before the mixed streams can be transferred to the mold. To overcome this difficulty, Klosiewicz teaches the inclusion of a reaction rate moderator in the activator stream to delay the catalyst activation until the reaction mass is totally within the mold. The total time from mixing the two streams until polymerization is substantially complete is still just a matter of seconds.

In the typical system, according to Klosiewicz, the catalyst component is a tungsten or molybdenum halide and the activator is an alkyl aluminum compound. The reaction rate moderator can be an ester, ether, ketone or nitrile.

Due to the extremely rapid rate of reaction of cycloolefins, even in the presence of the rate-moderated catalyst, useful polymerization has heretofore been accomplished almost exclusively by the reaction injection molding (RIM) process using the two-stream process of Klosiewicz. Even in RIM processes, the short gelation times limit the application to relatively small items and to relatively non-detailed molds with a minimum of sharp corners or "kiss-off" sections which tend to trap pockets of air if the mold is filled too rapidly or if the viscosity of the polymerization mass builds up so rapidly that the gelled monomer does not flow easily into corners or around blocked-out sections. This polymerization method cannot readily be employed in thermoset molding techniques such as pour, rotational and resin transfer molding (RTM) applications which require relatively long mold filling times. A slowing down of the polymerization is necessary for large molds. Ideally for these applications gelation is delayed with cure following rapidly.

It has been found possible (see Leach U.S. Pat. No. 4,458,037) to extend the gelation time to as much as ten minutes at room temperature by use of a dialkyl aluminum iodide activator moderated by di-n-butyl ether. When heated to 80° C., this mixture polymerizes in about 15 seconds. This system is also unsatisfactory in procedures where filling of the mold takes place slowly since the mold temperature must be held low enough during the filling operation that the reaction mixture remains fluid until the mold is entirely filled and then raised to the reaction temperature. For commercially practical production rates to be attained, the differential between mold filling temperature and polymerization reaction temperature must be smaller than is possible using the catalyst of Leach.

Several other methods have been used to increase gelation times at normal molding temperatures. Nelson in U.S. Pat. No. 4,727,125 employed nucleophilic Lewis bases selected from the class consisting of unsaturated cyclic amines such as various pyridines, pyrazines, quinoline and qunioxaline and saturated polycyclic amines such as hexamethylene tetramine and 1,4-diazabicyclo[2,2,2]octane as reation rate moderators. Substantial delays were found, but the level of residual monomer was unacceptably high for many applications. Most recently, in U.S. Pat. Ser. No. 53,429, now U.S. Pat. No. 4,826,942, Nelson employed a 1,3-bidentate Lewis base as a reaction rate moderator to delay the onset of gelation. Bell in U.S. Pat. Appl. Ser. No. 250,209 employed zinc alkyl activators instead of the aluminum alkyl compounds usually used in this type of polymerization. The problem of high residual monomer was also present in some of his results.

It is the object of this invention to provide cycloolefin polymerization feedstreams having substantially increased gelation times at normal molding temperatures compared with such mixtures heretofore known.

It is a further object of this invention to provide polymers having a low level of residual monomer.

In accordance with this invention, it has been found that the onset of gelation or viscosity build-up of metathesis polymerizable cycloolefins at temperatures up to at least about 80° C. can be significantly delayed by employing as a reaction rate moderator one or more of certain nitrogen-containing compounds. These compounds may be added to either the catalyst-containing feedstream or to the activator-containing feedstream, provided that the components remain stable in the presence of these compounds.

Nitrogen containing compounds which can be employed in the improved process of this invention are usually included among the anilines, alkyl arylamines and related compounds. The nitrogen compounds may be represented by the general formula

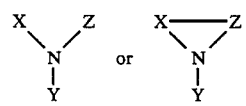

wherein X represents aryl, alkaryl or haloaryl groups, Y represents hydrogen or an alkyl group and Z represents alkyl, aralkyl, cycloalkyl groups or hydrogen. When neither Y nor Z represents hydrogen, X, Y and Z all must represent an alkyl group. Useful compounds include aniline, N-ethylaniline, indoline, triethylamine, ethylpiperidine and methylpiperidine.

Preferred additives include N-ethylaniline and indoline. These preferred additives have been chosen as being readily available in the commercial marketplace, and as being effective in lower concentrations thus minimally affecting the properties of the polymer being produced.

The metathesis catalyst system is comprised of two parts, i.e., a catalyst component and an activator. The catalyst component is preferably either a molybdenum or a tungsten halide or such a halide having two valences satisfied by oxygen rather than halogen. The most preferred catalyst component is a tungsten halide, and preferably a mixture or complex of tungsten hexachloride ($WCl_6$) and tungsten oxytetrachloride ($WOCl_4$) in a molar ratio of $WOCl_4$ to $WCl_6$ of about 1:9 to 2:1. This mixture or complex is prepared by contacting essentially pure $WCl_6$ with a controlled portion of an oxygen donor. Useful oxygen donors include, e.g., a hydrated salt, water, a wet molecular sieve and alkyl alcohols. The most preferred oxygen donor is t-butanol. Complete details of the catalyst preparation can be found in Klosiewicz, U.S. Pat. No. 4,568,660.

The tungsten or molybdenum compound is not normally soluble in the monomer, but can be solubilized by complexing it with a phenolic compound. The compound is first suspended in a small amount of an inert diluent such as benzene, toluene, xylene or chlorinated benzene to form a 0.1 to 1 mole per liter slurry. The phenolic compound is added to the slurry in a molar ratio of about 1:1 to 1:3 catalyst compound to phenolic compound and a stream of dry inert gas is passed through the agitated solution to remove hydrogen chloride gas. Preferred phenolic compounds include phenol, alkyl phenols, halogenated phenols or phenolic salts such as lithium or sodium phenoxide. The most preferred phenolic compounds are t-butyl phenol, t-octyl phenol and nonyl phenol.

To prevent premature polymerization of the catalyst component/monomer solution, which would occur within a matter of hours, about 1 to 5 moles of a Lewis base or a chelating agent are added per mole of catalyst compound. Preferred chelants include acetylacetones, dibenzoyl methane and alkyl acetoacetates, where the alkyl group contains from 1 to 10 carbon atoms. Preferred Lewis bases are nitriles and ethers such as benzonitrile and tetrahydrofuran. The improvement in stability and shelf-life of the catalyst component/monomer solution is obtained whether the complexing agent is added before or after the phenolic compound. When this complexed catalyst component is added to purified cycloolefin, for example dicyclopentadiene, it forms a solution which is stable and has a shelf-life of several months in the absence of an activator.

The second part of the metathesis catalyst system is the activator, which is an alkyl aluminum, alkyl zinc or an alkyl tin compound. The alkyl aluminum compounds, either trialkyl aluminum or dialkyl aluminum halide, are preferred. Particularly preferred is a dialkyl aluminum halide with an alkyl moiety containing 1 to 12 carbon atoms and iodide as the halide. The activator is readily soluble in the cycloolefin. The activator is prepared by mixing the alkyl aluminum compound or mixture of alkyl aluminum compounds with a Lewis base or chelating agent at a 1:1 to 1:5 molar ratio. While either order of addition, i.e., Lewis base to alkyl aluminum compound or alkyl aluminum compound to Lewis base, can be used, it is preferred to add the Lewis base to the alkyl aluminum with agitation. The reaction is highly exothermic, and it is desirable to control the rate of Lewis base addition to the alkyl aluminum compound so as to maintain the temperature at less than approximately 50° C. to prevent decomposition of the rate moderator complex. In the case of solid Lewis bases, the base can be added as the solid or dissolved in a suitable nonreactive solvent such as toluene. The activator can also be prepared by dissolving or suspending the Lewis base in the cycloolefin and adding the alkyl aluminum component. In all examples herein the activator had bis(2-methoxyethyl) ether, also known as diglyme, added. This procedure differs from that disclosed in Nelson, U.S. Pat. No. 4,727,125 wherein the amine compounds used as additives without addition of diglyme to the activator. Other Lewis acids and chelating agents will also work.

When the two parts of the catalyst system are combined, the resulting cycloolefin (for example dicyclopentadiene) to catalyst compound ratio will be from about 500:1 to about 15,000:1 on a molar basis, preferably 2000:1 and the catalyst compound to alkyl aluminum ratio will be from about 1:2 to about 1:5.

A cycloolefin reaction mixture moderated by nitrogen-containing compounds according to this invention remains fluid for a relatively long time at room temperature prior to forming a gel. By varying the amounts of additive, activator and catalyst as well as the starting temperature, it is possible to delay the gel time over a wide time period. Thus, the catalyst components need not be mixed and immediately injected into a mold. While the RIM technique can be employed, processing is not limited to the RIM technique. Moreover, the RIM technique can be used with a premixed reactive solution (i.e., cycloolefin containing both catalyst and activator) and materials can be charged directly into the heated mold without using a mix head on the molding machine.

The great advantage of using the additives of this invention results from the extended gel time that they provide at convenient molding temperatures, i.e., about 80° C. At 80° C., the gel time can be extended to as long as three minutes and more; whereas solutions containing conventional rate moderators gel within 15 to 20 seconds at most. This extended gel time, during which the reaction mixture remains highly fluid, allows the reaction mixture to be used in techniques where molds are filled slowly. For example, the mixture can be employed in rotational molding where centrifugal force is employed to distribute the mixture and where the polymerization reaction cannot be permitted to start until uniform distribution is achieved. The mixtures are also useful in preparing polymer articles filled with glass or other fibrous mat reinforcement where the mixture must remain fluid until it has completely impregnated the mat. Manufacture of large objects, where the volume of the mold, per se, necessitates long filling time, can also be facilitated by using the additives of this invention. Using the additives described in this invention, molds can be charged at the polymerization temperature in most cases.

In the known processes, where RIM processing is usually contemplated, combining of the components is most conveniently accomplished by mixing equal parts of two solutions, one of which contains twice the desired concentration of catalyst component, and the other of which contains twice the desired concentration of activator. This is possible, but not necessary, when the rate moderators contemplated herein are employed. Since the reactive mixture does not gel immediately, it is frequently convenient to add one part of the system to substantially all of the cycloolefin and, just prior to the polymerization and molding, add a concentrate of the other part.

Monomers that may be used with this invention include strained ring non-conjugated cycloolefins which are metathesis polymerizable. These include, for example, dicyclopentadiene, dicyclopentadiene oligomers, norbornene, norbornadiene, 4-alkylidene norbornenes, dimethanooctahydronaphthalene, dimethanohexahydronaphthalene and substituted derivatives of these compounds. The preferred cyclic olefin monomer is dicyclopentadiene or a mixture of dicyclopentadiene with other strained ring hydrocarbons in ratios of 1 to 99 mole % of either monomer, preferably about 75 to 99 mole % dicyclopentadiene.

The invention is illustrated by the following examples. In these examples, the catalyst component was prepared by suspending a $WCl_6/WOCl_4$ complex in toluene, reacting it with phenol to solubilize it and complex it with acetyl acetone. This product was then diluted to a 0.1 molar concentration by adding sufficient additional toluene. A 1.0 molar toluene solution of an 85:15 mixture of tri-n-octyl aluminum (TNOA) and dioctyl aluminum iodide (DOAI) was prepared. One equivalent of bis(2-methoxyethyl) ether (diglyme) per mole of combined TNOA and DOAI was added to form a standard, state of the art control activator for dicyclopentadiene polymerization. The following examples are illustrative of this invention and are not intended to limit its scope in any way.

CONTROL EXAMPLES

To a nitrogen-sparged vessel was charged 5 volumes of dicyclopentadiene. To this was added 0.06 volume of the standard 85:15 TNOA/DOAI mixture described above, and the mass was mixed well. After the mixing, 0.2 volume of the 0.1 M tungsten catalyst component solution was injected and mixed well. The vessel was immersed in a constant temperature bath maintained at 80° C. or at other temperatures as indicated in the individual examples.

The time from addition of the tungsten catalyst component until formation of a non-fluid gel was noted and recorded as the gel time. Similarly, the time from addition of the catalyst until the temperature reached 100° C. (or 160° C. in the case of runs started at 80° C.) was recorded and considered the cure time. The difference between the starting and maximum temperatures was recorded as $\Delta T$. The thermocouple used to measure the temperatures was rotated during the polymerization (when above 100° C.) so as to break the seal with the polymer plug, then removed before it became "frozen" in place. For the control examples, these values are recorded in Table I. It typically took 3 seconds to gel and 30 seconds to reach 100° C. for the higher purity DCPD monomer. The comparable values for the lower purity DCPD monomer in the control examples were 8 seconds and 42 seconds.

TABLE I

| Example No. | Wt. % of Additive | Initial Temp. °C. | Gel Time (sec) | Seconds to 100° C. | Δ T | % Residual Monomer |
|---|---|---|---|---|---|---|
| Control 1 | *0 | 32 | 3 | 32 | 180 | 2.32 |
| Control 2 | *D 0 | 32 | 3 | 30 | 170 | 0.4 |
| Control 3 | *D 0 | 32 | 3 | 28 | 170 | 0.5 |
| Control 4 | *D 0 | 32 | 3 | 30 | 171 | 0.4 |
| Control 5 | **D 0 | 32 | 8 | 43 | 182 | 0.90 |
| Control 6 | **0 | 30 | 8 | 42 | 199 | 1.28 |
| Control 7 | **D 0 | 31 | 8 | 43 | 172 | — |
| Control 8 | **0 | 32 | — | — | — | 0.77 |

*DCPD was about 99.4% pure
**DCPD was about 98.7% pure
D = 1 volume diphenyldichloromethane added per volume tungsten on a molar basis.

EXAMPLES 1 to 11

In Examples 1 through 11 a series of amine compounds were tested for their effect upon gel and cure times. These results are shown in Table II.

TABLE II

| Example No. | Wt. % Additive (Amines) | Initial Temp. °C. | Gel Time (sec) | Seconds to 100° C. | ΔT | % Residual Monomer |
|---|---|---|---|---|---|---|
| 1 | 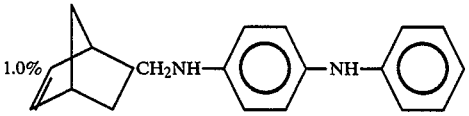 1.0% | 31 | 65 | 254 | 177 | 0.95 |
| 2A | 1.0% N—ethylaniline | 31 | 42 | 156 | 172 | 0.81 |
| 2B | * 1.0% N—ethylaniline | 30 | 28 | 68 | 167 | 0.47 |
| 3A | * 1.0% Indoline | 30 | N.R. | — | — | — |
| 3B | *D 0.5% Indoline | 78 | >90 | N.R. a | — | 2.75 |
| 3C | *D 0.5% Indoline | 31 | N.R. | — | — | — |
| 3D | * 0.5% Indoline | 63 | 30 | N.R. a | — | 2.39 |
| 3E | *D 0.1% Indoline | 32 | 40 | 168 | 190 | 0.43 |
| 4 | 1.0% Indole | 32 | 4 | 35 | 169 | — |
| 5 | 1.0% 2-phenylindole | 32 | 7 | 34 | 195 | — |
| 6A | * 1.0% Triphenylamine | 32 | N.R. | — | — | — |
| 6B | D* + 0.5% Triphenylamine | 32 | Instant | 29 | 133 | 0.7 poor mixing |
| 6C | D + 1.0% Triphenylamine | 32 | Instant | — | — | 0.5 poor mixing |
| 7A | + 0.5% 2,2,6,6 Tetramethyl-piperidine | 32 | N.R. | — | — | — |
| 7B | +* 0.5% 2,2,6,6 Tetramethyl-piperidine | 32 | instant | 29 | 133 | — |

TABLE II-continued

| Example No. | Wt. % Additive | Amines Initial Temp. °C. | Gel Time (sec) | Seconds to 100° C. | ΔT | % Residual Monomer |
|---|---|---|---|---|---|---|
| 7C | * 1.0% 2,2,6,6 Tetramethyl-piperidine | 32 | 12 | 76 | 168 | — |
| 7D | 1.0% 2,2,6,6 Tetramethyl-piperidine | 31 | 12 | 46 | 165 | — |
| 8A | 0.5% (C₆H₅)N(C₂H₅)₂ N,N—diethylaniline | 32 | 5 | 32 | 168 | — |
| 8B | 10% (C₆H₅)N(C₂H₅)₂ N,N—diethylaniline | 33 | 3 | 24 | 155 | 0.05 |
| 9A | D 0.25% (C₆H₅)NH₂ Aniline | 32 | 170 | N.R. a | — | 9.4 |
| 9B | D* 0.25% (C₆H₅)NH₂ Aniline | 32 | 100 | N.R. a | 172 | 1.8 |
| 9C | D 0.1% (C₆H₅)NH₂ Aniline | 33 | 40 | N.R. a | — | 3.6 |
| 9D | D* 0.1% (C₆H₅)NH₂ Aniline | 33 | 100 | N.R. a | — | 4.6 |

\* = Two times the usual level of catalyst and activator.
+ = Passage through neutral alumina.
D = 1 volume diphenyldichloromethane used per volume tungsten on a molar basis.
a = a hard plug formed in over 5 minutes.

N-ethylaniline (Example 2) at a 1.0% level delayed gel and cure times. Residual monomer levels were below 1% without the use of dichlorodiphenylmethane. The cyclic analog, indoline (Example 3), showed higher activity. Substantial delays were found even at the 0.1% level with indoline. Higher residual monomer levels were found in runs initiated at 63 and 78° C. These could be reduced through the addition of dichlorodiphenylmethane.

Aniline (Example 9) produced significant delays even at the 0.1% level, while N,N-diethylaniline (Example 8) did not affect polymerization even at the 10% level.

The aromatic analogs, indole and 2-phenylindole (Examples 4 and 5, respectively), were inactive in affecting polymerization as would be expected by comparison with diphenylamine. The nitrogen atoms in these aromatic amines are not very basic.

Various nitrogen compounds can be added to the catalyst and activator to delay the gel and cure in the metathesis polymerization of dicyclopentadiene. By varying the amounts of additive, activator and catalyst, as well as the starting temperature, any desired amount of delay could be achieved. The most desirable systems are those which provide slow gel with rapid cure while maintaining a low level of residual monomer. Among the additives listed in Table II, N-ethylaniline in particular exhibited these properties. Indoline also provided a desirable degree of delay of gel and cure. With these additives, it is now possible to have a one component system with thermal initiation of polymerization. An advantage that these systems have over some other systems previously studied is the compatibility of dichlorodiphenylmethane which can be used to lower the level of residual monomer.

What is claimed is:

1. A polymerization feed composition comprising:
   (a) a metathesis polymerizable cycloolefin;
   (b) a metathesis polymerization catalyst;
   (c) a catalyst activator comprising an alkyl aluminum compound; and
   (d) a reaction rate moderator, wherein said reaction moderator is a nitrogen compound represented by the formula:

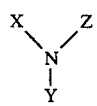

wherein X represents an aryl, alkaryl, or haloaryl group; Y represents an alkyl group or hydrogen and Z represents an alkyl, aralkyl, or cycloalkyl group or hydrogen, and wherein when neither Y nor Z represent hydrogen, X, Y and Z all must represent alkyl groups.

2. The polymerization feed composition of claim 1 wherein said metathesis polymerizable cycloolefin is a monomer selected from the group consisting of dicyclopentadiene, norbornene, norbornadiene, dimethanohexahydronaphthalene and substituted derivatives of said monomers, or a mixture of two or more of said monomers.

3. The polymerization feed composition of claim 2 wherein said metathesis polymerizable cycloolefin is dicyclopentadiene.

4. The polymerization feed composition of claim 3 wherein said reaction rate moderator comprises an additive selected from the group consisting of alkylarylamines and aryl amines.

5. The composition of claim 4 wherein the reaction rate moderator is an alkylarylamine selected from the group consisting of N-ethylaniline and aniline.

6. The composition of claim 5 wherein dichlorodiphenylmethane is added to said metathesis polymerization catalyst.

7. In a process for preparing molded objects wherein a liquid reaction mass comprising a metathesis polymerizable cycloolefin, a metathesis polymerization catalyst, an alkyl aluminum catalyst activator and a reaction rate moderator are charged to a mold in which polymerization will take place, the improvement wherein said reaction rate moderator comprises:

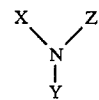

wherein X represents an aryl, alkaryl, or haloaryl group; Y represents an alkyl group or hydrogen and Z represents an alkyl, aralkyl, or cycloalkyl group or hydrogen, and wherein when neither Y nor Z represents hydrogen, X, Y and Z all must represent alkyl groups.

8. The process of claim 7 wherein said cycloolefin is a monomer selected from the group consisting of dicyclopentadiene, norbornene, norbornadiene, dimethanooctahydronaphthalene, dimethanohexahydronaphthalene and substituted derivatives of said monomers, or a mixture of two or more of said monomers.

9. The process of claim 8 wherein said cycloolefin is dichclopentadiene.

10. The process of claim 9 wherein said reaction rate moderator is selected from the group consisting of alkylarylamines and aryl amines.

11. The process of claim 10 wherein said alkylarylamine is selected from the group consisting of aniline and N-ethylaniline.

12. The process of claim 7 wherein dichlorodiphenylmethane is added to said methatesis polymerization catalyst.

* * * * *

UNITED STATES PATENT AND TRADEMARK OFFICE
CERTIFICATE OF CORRECTION

PATENT NO.   :   4,883,849
DATED        :   NOVEMBER 28, 1989
INVENTOR(S)  :   MATLACK

It is certified that error appears in the above-identified patent and that said Letters Patent is hereby corrected as shown below:

Patent Column 2, Line 14

"qunioxaline"   should read   --quinoxaline--

Patent Column 2, Line 16

"reation"   should read   --reaction--

Patent Column 5, Line 16

"dichclopentadiene"   should read   --dicyclopentadiene--

Patent Column 10, Line 4

"methatesis"   should read   --metathesis--.

Signed and Sealed this

Twenty-sixth Day of February, 1991

*Attest:*

HARRY F. MANBECK, JR.

*Attesting Officer*        *Commissioner of Patents and Trademarks*